US011232342B2

(12) United States Patent
Omori

(10) Patent No.: US 11,232,342 B2
(45) Date of Patent: Jan. 25, 2022

(54) RFID TAG AND METHOD FOR MANUFACTURING RFID TAG

(71) Applicant: Murata Manufacturing Co., Ltd., Nagaokakyo (JP)

(72) Inventor: Ryohei Omori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 16 days.

(21) Appl. No.: 16/400,328

(22) Filed: May 1, 2019

(65) Prior Publication Data

US 2019/0258916 A1 Aug. 22, 2019

Related U.S. Application Data

(63) Continuation of application No. PCT/JP2017/040142, filed on Nov. 7, 2017.

(30) Foreign Application Priority Data

Nov. 10, 2016 (JP) .............................. JP2016-219884

(51) Int. Cl.
*G06K 19/077* (2006.01)
*H01P 11/00* (2006.01)
*G06K 19/00* (2006.01)

(52) U.S. Cl.
CPC ..... *G06K 19/07773* (2013.01); *G06K 19/077* (2013.01); *G06K 19/07718* (2013.01); *H01P 11/00* (2013.01); *G06K 19/00* (2013.01)

(58) Field of Classification Search
CPC ................................................ G06K 19/07773
(Continued)

(56) References Cited

U.S. PATENT DOCUMENTS

2001/0053675 A1 12/2001 Plettner
2007/0069341 A1* 3/2007 Usami .............. G06K 19/07718
257/666

(Continued)

FOREIGN PATENT DOCUMENTS

EP 1031940 A1 8/2000
EP 2405054 A1 1/2012
(Continued)

OTHER PUBLICATIONS

International Search Report issued for PCT/JP2017/040142, dated Jan. 9, 2018.
(Continued)

*Primary Examiner* — Rafferty D Kelly
(74) *Attorney, Agent, or Firm* — Arent Fox LLP

(57) ABSTRACT

An RFID tag includes a booster antenna, a feeding loop, an RFID module, and a sheet-like insulating base. The insulating base includes first and second sides that are opposite to each other. The booster antenna is comprised by one metal wire having one end on the first side of the insulating base and the other end on the second side of the insulating base and includes a first curved portion that reverses a direction of the metal wire extending from the one end and a second curved portion that reverses a direction of the metal wire, which is reversed by the first curved portion, to connect to the other end. Moreover, the RFID module is disposed in a region surrounded by the metal wire including the first curved portion and the second curved portion.

20 Claims, 11 Drawing Sheets

(58) Field of Classification Search
USPC .......................................................... 235/492
See application file for complete search history.

(56) References Cited

U.S. PATENT DOCUMENTS

2009/0302121 A1    12/2009  Shioya et al.
2009/0303010 A1*   12/2009  Sakama ........... G06K 19/07749
                                                        340/10.1

FOREIGN PATENT DOCUMENTS

JP          4697332 B2    6/2011
WO          2004107262 A1 12/2004

OTHER PUBLICATIONS

Written Opinion of the International Searching Authority issued for PCT/JP2017/040142, dated Jan. 9, 2018.

* cited by examiner

RFID TAG AND METHOD FOR MANUFACTURING RFID TAG

CROSS REFERENCE TO RELATED APPLICATIONS

The present application is a continuation of PCT/JP2017/040142 filed Nov. 7, 2017, which claims priority to Japanese Patent Application No. 2016-219884, filed Nov. 10, 2016, the entire contents of each of which are incorporated herein by reference.

TECHNICAL FIELD

The present disclosure relates to an RFID tag (Radio Frequency Identification) and a method for manufacturing an RFID tag.

BACKGROUND

In recent years, RFID systems have been used as an information control system of goods, where the RFID systems have an RFID tag attached to goods to communicate with a reader/writer in a noncontact manner using an electromagnetic field to transmit predetermined information. This RFID tag includes an RFIC element configured to store the predetermined information and to process an RF signal, and also includes an antenna element for transmission and reception of information. As such an RFID tag, various configurations have been disclosed (see, for example, Patent Documents 1 and 2).

PATENT DOCUMENT 1: EP 2405054 B
PATENT DOCUMENT 2: JP 4697332 B1

However, it has been demanded recently to improve productivity of RFID tags such as the RFID tags disclosed in Patent Documents 1 and 2.

SUMMARY OF THE INVENTION

Thus, an object of the present disclosure to provide an RFID tag with high productivity and a method for manufacturing the RFID tag.

To achieve the object, a method for manufacturing an RFID tag according to the present invention includes preparing a sheet-like insulating base having a plurality of regions which are arranged in a first direction, with the plurality of regions being delimited with each other at a plurality of cutting lines along a second direction crossing the first direction; and disposing one metal wire across the plurality of regions on an upper surface of the insulating base. Moreover, the method includes disposing in each of the regions an RFID module that includes a feeding loop configured to couple to the metal wire via an electromagnetic field; and an RFIC element connected to the feeding loop. The method further includes cutting the one metal wire and the sheet-like insulating base along the cutting lines to obtain a plurality of RFID tags corresponding to the divided regions. In the exemplary aspect the disposing of the metal wire includes a step of disposing the metal wire to form a pattern including, in each of the regions, a first curved portion configured to reverse a direction of the metal wire and a second curved portion configured to reverse a direction of the metal wire reversed by the first curved portion. Moreover, the disposing of the RFID module includes disposing in each of the regions the RFID module in a region surrounded by the metal wire including the first curved portion and the second curved portion.

Also, an exemplary RFID tag is provided according to the present invention that includes a booster antenna comprised by one metal wire bended within a plane; an RFID module including a feeding loop configured to couple to the booster antenna via an electromagnetic field; an RFIC element connected to the feeding loop; and a sheet-like insulating base configured to hold the booster antenna and the RFID module within a same plane. Moreover, the insulating base includes a first side and a second side, which are opposite to each other, and the booster antenna, which is comprised by the one metal wire having one end on the first side of the insulating base and the other end on the second side of the insulating base, including a first curved portion configured to reverse a direction of the metal wire extending from the one end and a second curved portion configured to reverse a direction of the metal wire, which is reversed by the first curved portion, to connect to the other end. Moreover, the RFID module is disposed in a region surrounded by the metal wire including the first curved portion and the second curved portion.

The RFID tag and the method for manufacturing the RFID tag according to the present invention achieves high productivity compared with convention designs of Patent Documents 1 and 2.

DETAILED DESCRIPTION OF THE EXEMPLARY EMBODIMENTS

Figure 1:
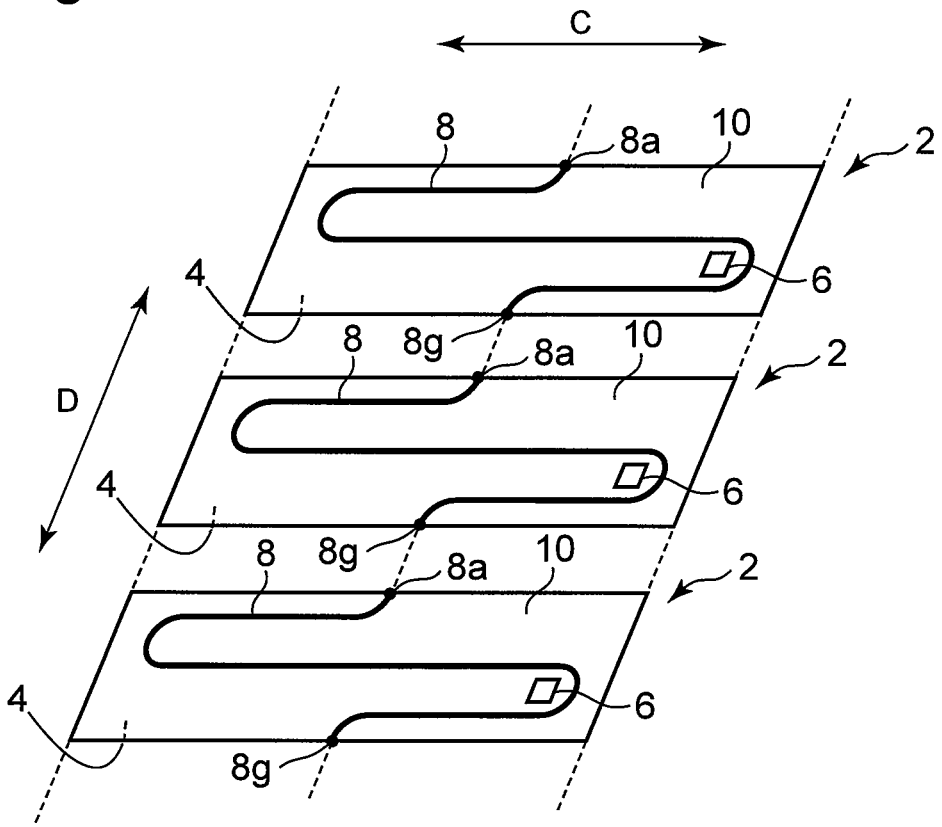
FIG. 1 is a schematic perspective view in which a plurality of RFID tags according to embodiment 1 are arranged.

A first exemplary aspect of the present disclosure provides a method for manufacturing an RFID tag, comprising preparing a sheet-like insulating base having a plurality of regions which are arranged in a first direction, the plurality of regions being delimited with each other at a plurality of cutting lines along a second direction crossing the first direction; disposing one metal wire across the plurality of regions on an upper surface of the insulating base; disposing in each of the regions an RFID module including: a feeding loop configured to couple to the metal wire via an electromagnetic field; and an RFIC element connected to the feeding loop; and a step of cutting the one metal wire and the sheet-like insulating base along the cutting lines to obtain a plurality of RFID tags corresponding to the divided regions. Moreover, the step of disposing the metal wire includes disposing the metal wire to form a pattern including, in each of the regions, a first curved portion configured to reverse a direction of the metal wire and a second curved portion configured to reverse a direction of the metal wire reversed by the first curved portion, and the step of disposing the RFID module includes disposing in each of the regions the RFID module in a region surrounded by the metal wire including the first curved portion and the second curved portion. Such a method can continuously manufacture RFID tags each having a pattern of metal wire, thereby achieving high productivity.

According to a second exemplary aspect of the present disclosure, the step of cutting the metal wire and the insulating base includes cutting the metal wire and the insulating base with the plurality of cutting lines parallel to each other along the second direction perpendicular to the first direction, and the step of disposing the metal wire includes disposing the metal wire parallel to the cutting lines, to be reversed by the first curved portion and the second curved portion, in the first aspect of the present invention. Such a method can achieve high productivity of the RFID tags.

According to a third exemplary aspect of the present disclosure, the step of disposing the metal wire includes disposing the metal wire such that, in each of the regions, one end and the other end of the metal wire both corresponding to the cutting lines are disposed on a same line extending parallel to the first direction and each pattern of the metal wire has a same shape, in the second aspect of the present invention. Such a method can continuously manufacture the RFID tags each having a metal wire of the same pattern, thereby achieving high productivity of the RFID tags while stabilizing properties of the RFID tags.

According to a fourth exemplary aspect of the present disclosure, the step of disposing the metal wire includes disposing the metal wire such that each pattern of the metal wire has a point-symmetric shape, in the second aspect of the present invention. Such a method can make the RFID tags each having a metal wire of a pattern, which will be the same pattern if rotated by 180 degrees. That is, the RFID tags having similar properties can be manufactured continuously.

According to a fifth exemplary aspect of the present disclosure, the step of disposing the metal wire disposes the metal wire continuously without returning in the first direction, in any one of the first aspect to the fourth aspect of the present invention. Such a method can achieve high productivity of the RFID tags.

A sixth exemplary aspect of the present disclosure provides an RFID tag comprising: a booster antenna comprised by one metal wire bended within a plane; an RFID module including: a feeding loop configured to couple to the booster antenna via an electromagnetic field; and an RFIC element connected to the feeding loop; and a sheet-like insulating base configured to hold the booster antenna and the RFID module within a same plane. According to the exemplary aspect, the insulating base includes a first side and a second side, which are opposite to each other, the booster antenna, which is comprised by the one metal wire having one end on the first side of the insulating base and the other end on the second side of the insulating base, includes a first curved portion configured to reverse a direction of the metal wire extending from the one end and a second curved portion configured to reverse a direction of the metal wire, which is reversed by the first curved portion, to connect to the other end, and the RFID module is disposed in a region surrounded by the metal wire including the first curved portion and the second curved portion. Such an RFID tag can be manufactured by a method of continuously manufacturing RFID tags each having a pattern of metal wire, thereby achieving high productivity.

According to an exemplary seventh aspect of the present disclosure, the first side and the second side of the insulating base extend substantially parallel to each other, and the metal wire reversed by the first curved portion and the second curved portion of the booster antenna extends parallel to the first side and the second side, in the sixth aspect of the present invention. According to such an RFID tag, high productivity can be achieved.

According to an eighth exemplary aspect of the present disclosure, the one end and the other end of the booster antenna are disposed on a same line perpendicular to directions in which the first side and the second side extend within the plane, in the seventh aspect of the present invention. Such an RFID tag can be manufactured by a method of continuously manufacturing RFID tags each having a booster antenna of the same pattern, thereby achieving high productivity while stabilizing properties of the RFID tags.

According to a ninth exemplary aspect of the present disclosure, the booster antenna has a point-symmetric shape within the plane, in seventh aspect of the present invention. Such an RFID tag has a metal wire of a pattern, which will be the same pattern if rotated by 180 degrees, and thus can be manufactured by a method of continuously manufacturing RFID tags having similar properties.

According to a tenth exemplary aspect of the present disclosure, the booster antenna extends from the one end to the other end without returning in a direction perpendicular to a direction in which the first side and the second side extend, in any one of the sixth aspect to the ninth aspect of the present invention. According to such an RFID tag, high productivity can be achieved.

As described below, exemplary embodiments of the present invention are provided in detail with reference to the drawings.

Embodiment 1

Figure 2:
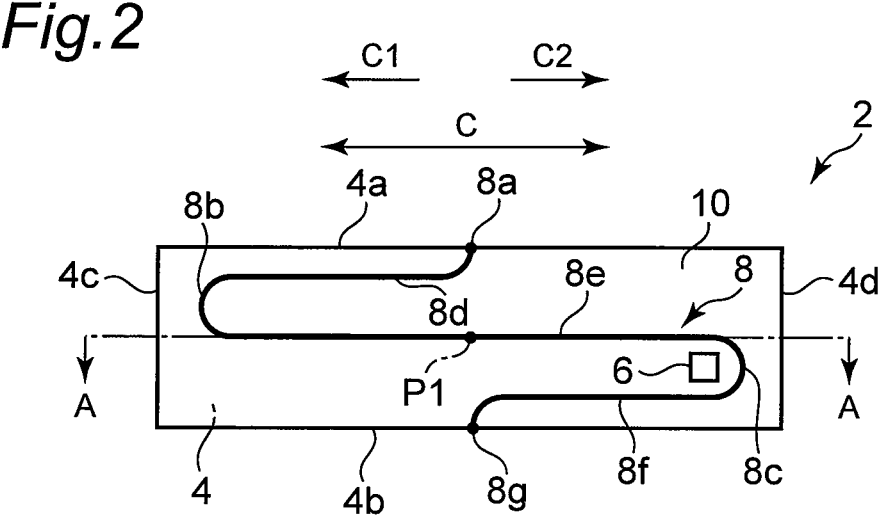
FIG. 2 is a schematic plan view of an RFID tag.
Figure 3:
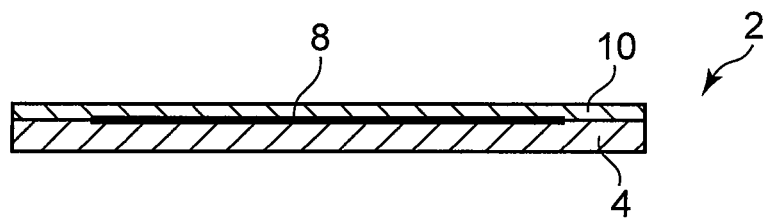
FIG. 3 is a schematic longitudinal cross-sectional view of an RFID tag.
Figure 4:
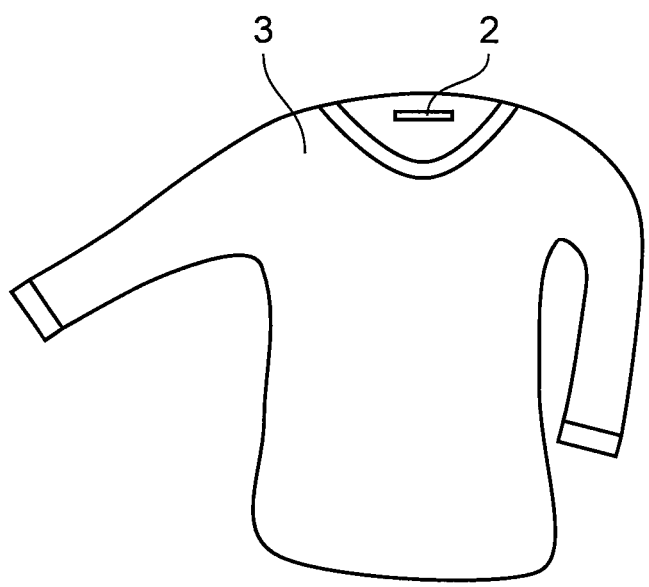
FIG. 4 is a schematic view in which an RFID tag is attached to goods.

FIGS. 1 to 4 illustrate a schematic configuration of an RFID tag 2 of exemplary embodiment 1. FIG. 1 is a schematic perspective view in which a plurality of RFID tags 2 is disposed (that is, RFID tags 2 are divided from each other). FIG. 2 is a schematic plan view of the RFID tag 2, and FIG. 3 is a cross-sectional view of the RFID tag 2 cut along A-A line of FIG. 2. FIG. 4 is a schematic view in which the RFID tag 2 is attached to an outfit 3 (that is, the RFID tag 2 is in use).

The RFID tag 2 is a tag for identifying goods such as a laundry product, and is a wireless IC device which is used with being attached to the goods. The RFID tag 2 of embodiment 1 is a UHF-band tag whose communication frequency band is the UHF band. As illustrated in FIG. 4, for example, the RFID tag 2 is used with being attached to the outfit 3, which is an example of the laundry product. The RFID tag 2 can communicate with a predetermined reader/writer (not illustrated) in a noncontact manner using an electromagnetic field so as to transmit identification information of goods or the like.

The RFID tag 2, as illustrated in FIGS. 1 and 3, includes an insulating base 4, an RFID module 6, a booster antenna (i.e., metal wire) 8, and a sealing member 10. The RFID module 6 and the booster antenna 8 are disposed on an upper surface of the insulating base 4 and sealed by the sealing member 10 from above. The booster antenna 8 is sealed by the sealing member 10, but the booster antenna 8 is illustrated by the solid line for descriptive purposes in FIGS. 1 and 2 and also other drawings.

The insulating base 4 and the sealing member 10 of embodiment 1 have a rectangular external shape in plan view as illustrated in FIGS. 1 and 2. Hereinafter, a longitudinal direction is defined as direction C, and a lateral direction is defined as direction D. Direction C and direction D both are parallel to the upper surface of the insulating base 4 and are perpendicular to each other.

As indicated by the dotted lines in FIG. 1, a plurality of RFID tags 2 are originally formed continuously in a row in direction D. The plurality of continuous RFID tags 2 has been divided and separated into individual RFID tags 2. The booster antennas 8 of the individual RFID tags 2 have been made by dividing and separating one metal wire continuously formed in direction D. Dividing the plurality of RFID tags 2, which was integrally formed, into individual RFID tags 2 successively makes the RFID tags 2 with the booster antennas 8 having the same pattern as illustrated in FIG. 1.

Since the booster antennas 8 for the plurality of RFID tags 2 are made from one metal wire with dividing the plurality of RFID tags 2 into individual RFID tags 2, the RFID tags 2 can be manufactured more quickly and continuously, as compared with a case where individual RFID tags are made from different metal wires. Such a method of forming the booster antennas 8 in so-called "one-stroke sketch" achieves high productivity of the RFID tags 2.

Next, explanation will be made regarding components of the RFID tag 2.

According to the exemplary aspect, the insulating base 4 is a member configured to support and hold the RFID module 6 and the booster antenna 8 from below. The insulating base 4 has a sheet shape and holds the RFID module 6 and the booster antenna 8 within the same plane. The material of the insulating base 4 may be selected based on application of the RFID tag 2, for example. According to an exemplary aspect, the material of the insulating base 4 of exemplary embodiment 1 is linen, that is a type of fabric, in consideration of strong external impact such as laundering due to being attached to the outfit 3.

The external shape of the insulating base 4 in plan view includes four sides 4a, 4b, 4c, and 4d. The first side 4a and the second side 4b are a pair of sides extending parallel to direction C, which is the longitudinal direction of the insulating base 4. The third side 4c and the fourth side 4d are a pair of sides extending parallel to direction D, which is the lateral direction of the insulating base 4. The first side 4a and the second side 4b are connected to each other by the third side 4c and the fourth side 4d, extending perpendicularly to the third side 4c and the fourth side 4d.

According to the exemplary aspect, the RFID module 6 is a member configured to store identification information of goods and to communication with a reader/writer (not shown) regarding the identification information.

Figure 5:
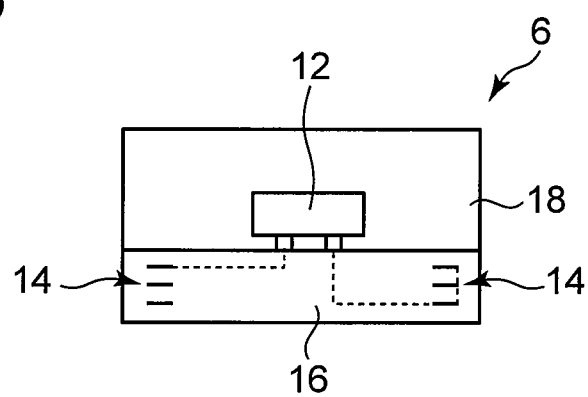
FIG. 5 is a schematic longitudinal cross-sectional view of a schematic RFID module.

A schematic configuration of the RFID module 6 is illustrated in FIG. 5. FIG. 5 is a schematic longitudinal cross-sectional view of the RFID module 6. As illustrated in FIG. 5, the RFID module 6 includes an RFIC element 12, a feeding loop 14, a substrate 16, and a sealing resin 18.

The RFIC element 12 is an element including a circuit that stores the identification information of the goods, or the like. The RFIC element 12 is placed on the substrate 16 and is electrically connected to the feeding loop 14. The feeding loop 14 is an interconnection that forms a looped power supply. When the RFID module 6 is viewed from above, the feeding loop 14 forms a spiral loop and is connected to a bottom of the substrate 16 (not shown). The feeding loop 14 is coupled to the aforementioned booster antenna 8 via an electromagnetic field, thereby having a function of activating the RFIC element 12. The substrate 16 is a substrate on which the RFIC element 12 is placed and which incorporates the feeding loop 14. The sealing resin 18 is resin for sealing the RFIC element 12 on the substrate 16.

As illustrated in FIG. 2, the RFID module 6 described above is disposed in a region surrounded by the metal wire of the booster antenna 8 (details of which will be described later). More specifically, the RFID module 6 of embodiment 1 is disposed on an inner side of a portion of the booster antenna 8, the portion being curved to reverse the direction of the booster antenna 8.

In the exemplary aspect, the booster antenna 8 is a metal wire that functions as a booster (amplifier) when the RFID module 6 communicates with the reader/writer. Disposing the RFID module 6 in the region surrounded by the metal wire of the booster antenna 8 enables communication between the RFID module 6 and the reader/writer using the booster antenna 8 as a booster. A detailed communication method will be described later.

As described above, the booster antenna 8 is comprised by one metal wire bent within a plane. As illustrated in FIG. 2, the booster antenna 8 is formed by one metal wire from one end 8a (i.e., a first end) to the other end 8g (i.e., a second end), including a plurality of straight portions and a plurality of curved portions. An outer shape of cross section of the metal wire is circular. It may be a single wire, e.g., of copper, but is preferably a stranded wire which is formed by twisting a plurality of metal fine wires, e.g., of copper. Alternatively, it may be a metal-plated fibrous core.

The one end 8a of the booster antenna 8 is positioned on the first side 4a of the insulating base 4, and the other end 8g is positioned on the opposite second side 4b. The one end 8a and the other end 8g are positioned at the same position in direction C, which is the longitudinal direction of the insulating base 4, i.e., positioned on the same line extending in direction D, which is the lateral direction.

As illustrated in FIG. 2, the booster antenna 8 includes two curved portions 8b and 8c and three connecting portions 8d, 8e, and 8f.

The first curved portion 8b and the second curved portion 8c are both curved to reverse the direction of the metal wire of the booster antenna 8. The first curved portion 8b is curved to reverse the first connecting portion 8d, which extends in direction C1 from the one end 8a of the booster antenna 8 toward the third side 4c, to extend in direction C2 toward the fourth side 4d. The second curved portion 8c is curved to reverse the second connecting portion 8e, which is reversed by the first curved portion 8b, to extend in direction C1 toward the third side 4c. In the exemplary embodiment 1, the first curved portion 8b and the second curved portion 8c are both formed in an arc shape having a central angle of 180 degrees.

The first connecting portion 8d extends to connect the one end 8a to one end of the first curved portion 8b of the booster antenna 8. The first connecting portion 8d of embodiment 1 is curved by 90 degrees from the one end 8a toward the third side 4c and then extends straightly to the first curved portion 8b. The second connecting portion 8e extends to connect the other end of the first curved portion 8b to one end of the second curved portion 8c. The second connecting portion 8e of embodiment 1 extends straightly parallel to direction C from the other end of the first curved portion 8b to the one end of the second curved portion 8c. The third connecting portion 8f extends to connect the other end of the second curved portion 8c to the other end 8g of the booster antenna 8. The third connecting portion 8f of embodiment 1 extends straightly parallel to direction C from the other end of the second curved portion 8c and then is curved by 90 degrees toward the other end 8g at a terminal end.

The booster antenna 8 described above has a point-symmetric shape in plan view. More specifically, the one end 8a and the other end 8g are arranged in opposite positions with respect to a center P1 of the insulating base 4, which is a midpoint of a line length of the booster antenna 8. Furthermore, the first connecting portion 8d and the third connecting portion 8f are point-symmetric with each other with respect to the center P1, and also the first curved portion 8b and the second curved portion 8c are point-symmetric with each other with respect to the center P1. The second connecting portion 8e passes the center P1 of the insulating base 4 and has two ends at symmetric positions with respect to the center P1. The two ends of the second connecting portion 8e correspond to the other end of the first curved portion 8b and the one end of the second curved portion 8c, respectively. It is noted that the center P1 is a virtual point.

With respect to the booster antenna 8 described above, the RFID module 6 of embodiment 1 is disposed in a region surrounded by the second curved portion 8c. As the RFID module 6 is disposed, the second curved portion 8c and a neighboring portion thereof function as a coupling (that is, matching section) configured to couple to the RFID module 6 via an electromagnetic field. Meanwhile, the first curved portion 8b and a neighboring portion thereof where the RFID module 6 is not disposed function as an electromagnetic wave emitter.

In the exemplary embodiment 1, the RFID module 6 is disposed offset from the center P1 of the insulating base 4. Thus, an electrical length on one side and an electrical length on the other side of the booster antenna 8 of metal wire are different from each other with respect to the RFID module 6. More specifically, the electrical length on the side including the one end 8a of the booster antenna 8 from the RFID module 6 is longer than the electrical length on the side including the other end 8g from the RFID module 6. During industrial laundering of the outfit including the RFID tag 2, the closer to the center of the RFID tag 2, the larger amount of bending will occur, thereby having a large stress. Thus, disposing the RFID module 6 offset from the center P1 of the insulating base 4 can suppress damage to the RFID module 6, thereby achieving more stable coupling between the RFID module 6 and the booster antenna 8.

Referring back to FIGS. 1 and 3, the sealing member 10 is configured to seal the RFID module 6 and the booster antenna 8 on the insulating base 4. The sealing member 10 is a sheet-like member that covers the entire upper surface of the insulating base 4 and has a rectangular shape with the same dimension as that of the insulating base 4 in plan view. Any insulating material may be used as a material of the sealing member 10 as with the insulating base 4. The material of the sealing member 10 of embodiment 1 is a transparent resin sheet, which is a type of insulating material.

Next, explanation will be made regarding a communication method of the RFID tag 2 described above. When using the RFID tag 2, the reader/writer is brought close to the RFID tag 2 attached to the goods such as the outfit 3. In response to an electromagnetic field generated by an antenna of the reader/writer, current flows in the booster antenna 8. Flowing of the current in the second curved portion 8c of the booster antenna 8g generates a magnetic field around the booster antenna 8. As the magnetic field generated covers the feeding loop 14 of the RFID module 6, the booster antenna 8 and the RFID module 6 are magnetically coupled. This magnetic coupling supplies power to the RFIC element 12 connected to the feeding loop 14, thereby activating the RFIC element 12. Then, the identification information of the goods stored in the circuit of the RFIC element 12 is read out and transmitted from the booster antenna 8 to the reader/writer with the first curved portion 8b and a neighbor metal wire thereof in the booster antenna 8 functioning as an emitter.

Figure 6:
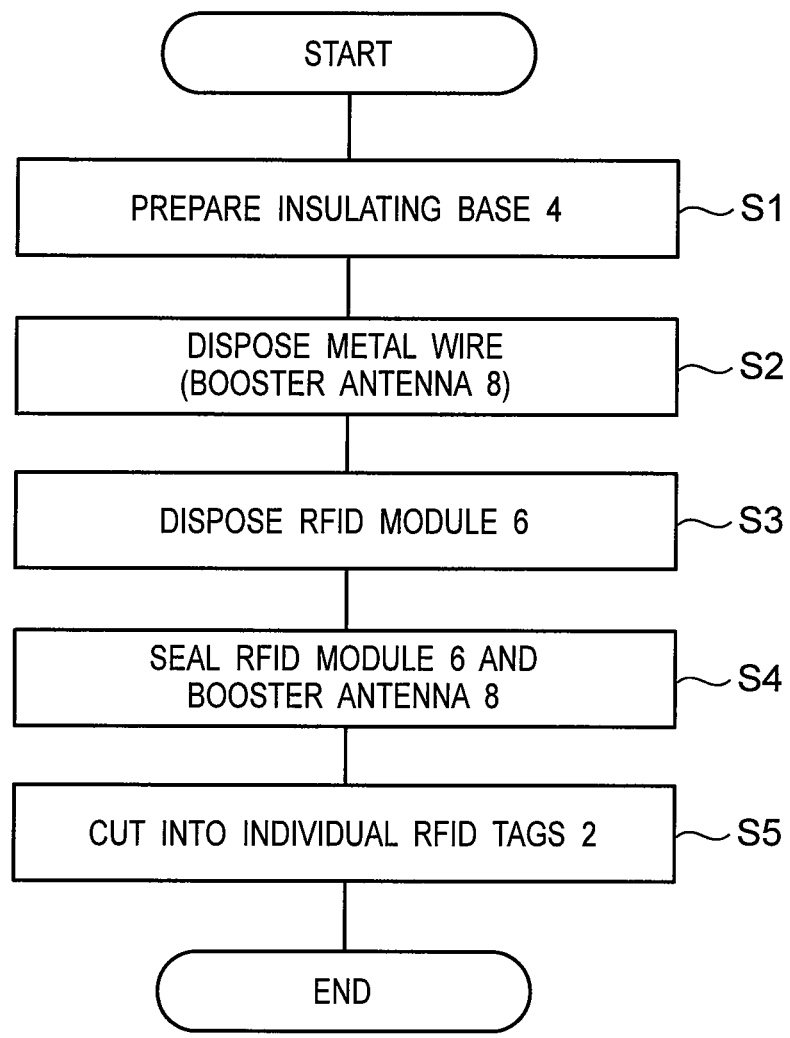
FIG. 6 is a flowchart illustrating a method for manufacturing an RFID tag according to embodiment 1.

Next, explanation of an exemplary method for manufacturing the RFID tag 2 will be made with reference to FIGS. 6, 7A to 7F, and 8A to 8E. FIG. 6 is a flowchart illustrating a method for manufacturing the RFID tag 2 of embodiment 1. FIGS. 7A to 7F are schematic plan views illustrating a sequence of manufacturing the RFID tag 2 according to the flowchart of FIG. 6. FIGS. 8A to 8E are schematic plan views illustrating a sequence of producing each pattern of the booster antenna 8.

Figure 7A:
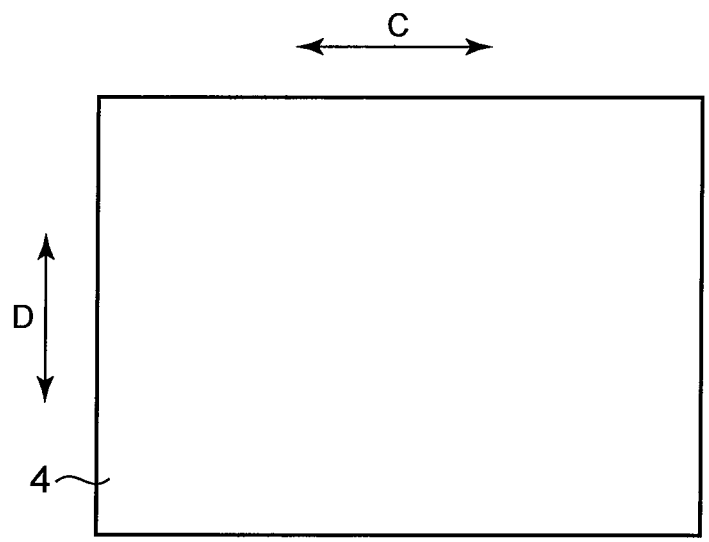
FIG. 7A is a schematic plan view illustrating a sequence of manufacturing an RFID tag along the flowchart of FIG. 6.

Firstly, as illustrated in FIG. 6, an insulating base 4 is prepared (step S1). More specifically, as Illustrated in FIG. 7A, the sheet-like insulating base 4 (made of linen in embodiment 1) is prepared and fixed in a predetermined position. In embodiment 1, the insulating base 4 has a generally rectangular shape.

Figure 7B:
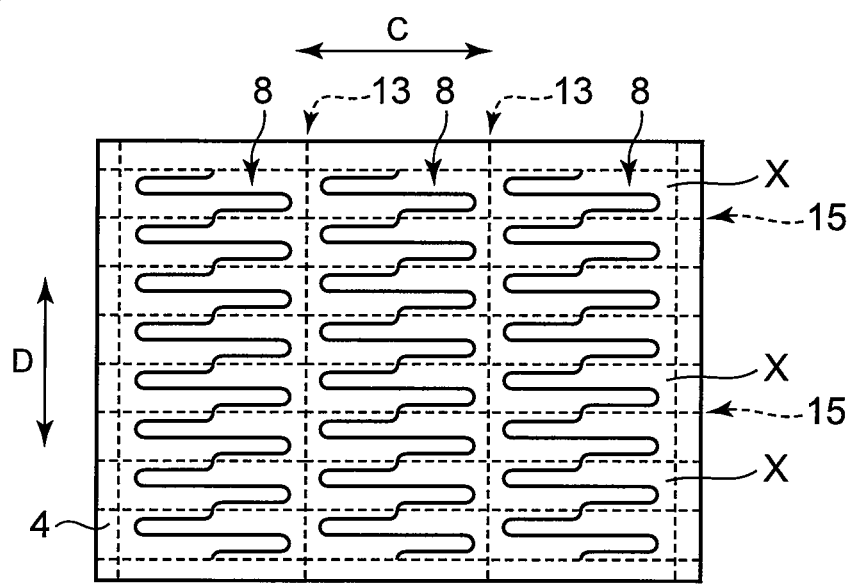
FIG. 7B is a schematic plan view illustrating a sequence of manufacturing an RFID tag along the flowchart of FIG. 6.

Next, metal wire is disposed (step S2). More specifically, as illustrated in FIG. 7B, one metal wire is disposed in each area on the upper surface of the insulating base 4. In embodiment 1, three metal wires are disposed concurrently. The metal wires are disposed such that each metal wire repeats a pattern more than once. More specifically, a shape of the booster antenna 8 illustrated in FIG. 2 described above is regarded as one pattern, and the one metal wire is disposed continuously such that such pattern is repeated in each predetermined region X. The regions X are a plurality of regions arranged in direction C and direction D as indicated by the dotted lines in FIG. 7B, and can be divided into a rectangular shape by cutting lines 13 and 15, which will be described later. The regions X of embodiment 1 are in a grid.

Any method may be used as a method of disposing the metal wire. For example, there is a method to sew the metal wire directly into the upper surface of the insulating base 4, a method to sew the metal wire as upper thread (needle thread) or lower thread (bobbin thread) when making an insulating base 4 by knitting, or a method of disposing the metal wire onto the upper surface of the insulating base 4 where an adhesive has been applied. Exemplary embodiment 1 uses the method to sew the metal wire directly into the upper surface of the insulating base 4, as an example.

Here, a method for producing each pattern of the booster antenna 8 is described in more detail with reference to FIGS. 8A to 8F. FIGS. 8A to 8F are schematic plan views illustrating a sequence of producing one pattern of the booster antenna 8.

Figure 8A:
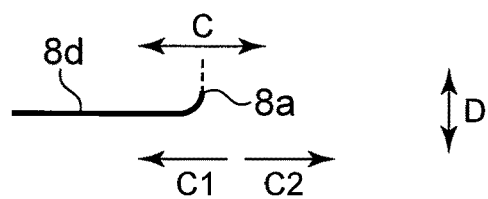
FIG. 8A is a schematic plan view illustrating a sequence of producing each pattern of a booster antenna.

When the metal wire reaches from a certain region X to a next region X (as shown in FIG. 7B), the first connecting portion 8*d* is formed from the one end 8*a*, which is a starting point, as illustrated in FIG. 8A. At the one end 8*a*, the metal wire faces in direction D, and the first connecting portion 8*d* is curved from the one end 8*a* by 90 degrees to face in direction C1 and then extends straightly along direction C1.

Figure 8B:
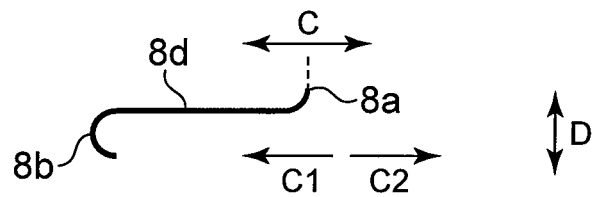
FIG. 8B is a schematic plan view illustrating a sequence of producing each pattern of a booster antenna.

Next, the first curved portion 8*b* is formed. More specifically, as illustrated in FIG. 8B, the first curved portion 8*b* is formed with being curved in a semicircular shape from an end of the first connecting portion 8*d* so as to reverse the direction of the first connecting portion 8*d*, which extends in direction C1, by 180 degrees. The first curved portion 8*b* reverses the direction of the metal wire by 180 degrees from direction C1 to direction C2.

Figure 8C:
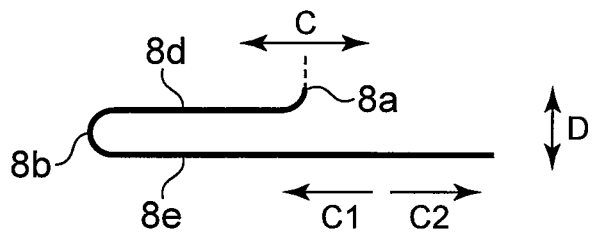
FIG. 8C is a schematic plan view illustrating a sequence of producing each pattern of a booster antenna.

Next, the second connecting portion 8*e* is formed. More specifically, as illustrated in FIG. 8C, the second connecting portion 8*e* is formed to extend straightly with maintaining the direction of the metal wire in direction C2, after being reversed by the first curved portion 8*b*.

Figure 8D:
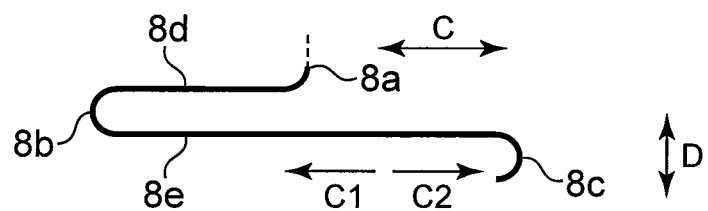
FIG. 8D is a schematic plan view illustrating a sequence of producing each pattern of a booster antenna.

Next, the second curved portion 8*c* is formed. More specifically, as illustrated in FIG. 8D, the second curved portion 8*c* is formed with being curved in a semicircular shape from an end of the second connecting portion 8*e* so as to reverse the direction of the second connecting portion 8*e*, which extends in direction C2, by 180 degrees. The second curved portion 8*c* reverses the direction of the metal wire by 180 degrees from direction C2 to direction C1.

Figure 8E:
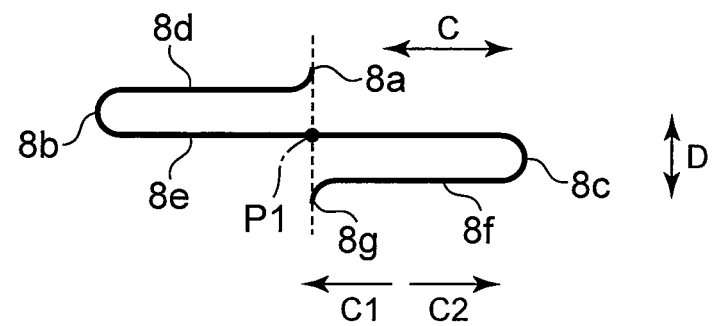
FIG. 8E is a schematic plan view illustrating a sequence of producing each pattern of a booster antenna.

Next, the third connecting portion 8*f* is formed. More specifically, as illustrated in FIG. 8E, the third connecting portion 8*f* is formed to extend straightly with maintaining the direction of the metal wire in direction C1, after being reversed by the second curved portion 8*c*. The third connecting portion 8*f* is curved at a terminal end thereof by 90 toward the other end 8*g* degrees to be connected to the other end 8*g*. At the other end 8*g*, the metal wire faces in direction D.

Thus, the pattern of the booster antenna 8 with a point-symmetric shape with respect to the center P1 as illustrated in FIG. 8E can be formed in the region X.

After the third connecting portion 8*f* is formed, the booster antenna 8 having the same pattern as the aforementioned pattern will be formed in the next region X.

In embodiment 1, the one end 8*a* and the other end 8*g* of each pattern of the booster antenna 8 are arranged in the same position in direction C, which is the longitudinal direction of the insulating base 4. Therefore, after one pattern of the booster antenna 8 is formed, next pattern of the booster antenna 8 can be formed continuously. Such a method achieves higher productivity of the RFID tag 2.

In Step S2 for disposing the metal wire, one metal wire is disposed across the plurality of regions X that are adjacent to each other along direction D as indicated by the dotted lines of FIG. 7B. As described above, the metal wire can be arranged in one-stroke sketch.

Figure 7C:
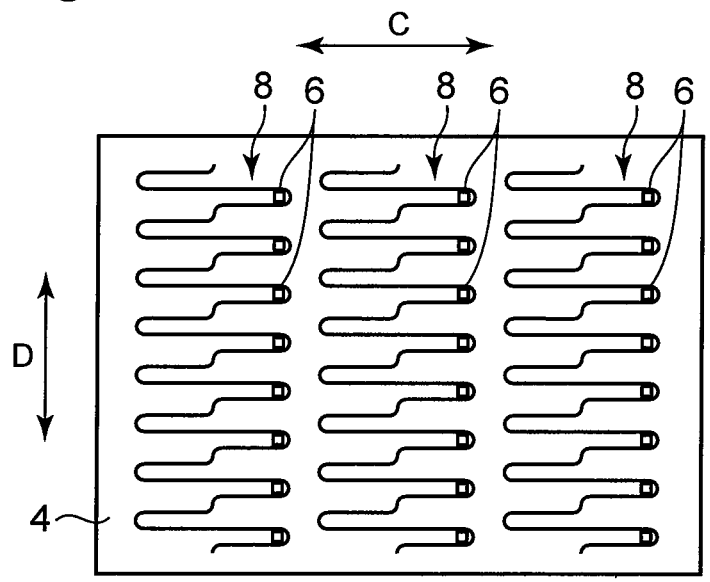
FIG. 7C is a schematic plan view illustrating a sequence of manufacturing an RFID tag along the flowchart of FIG. 6.

Referring back to FIG. 6, after the metal wire is disposed by step S2, the RFID module 6 is disposed (step S3). More specifically, as illustrated in FIG. 7C, the RFID modules 6 are disposed on the upper surface of the insulating base 4 on which the booster antennas 8 of a plurality of patterns are already arranged. In the exemplary aspect, the RFID modules 6 are disposed one by one on an inner side of the second curved portion 8*c* of each pattern of the booster antenna 8. Any method can be used as a method of arranging the RFID module 6. In embodiment 1, the RFID module 6 is disposed onto the insulating base 4 where an adhesive has been applied.

Figure 7D:
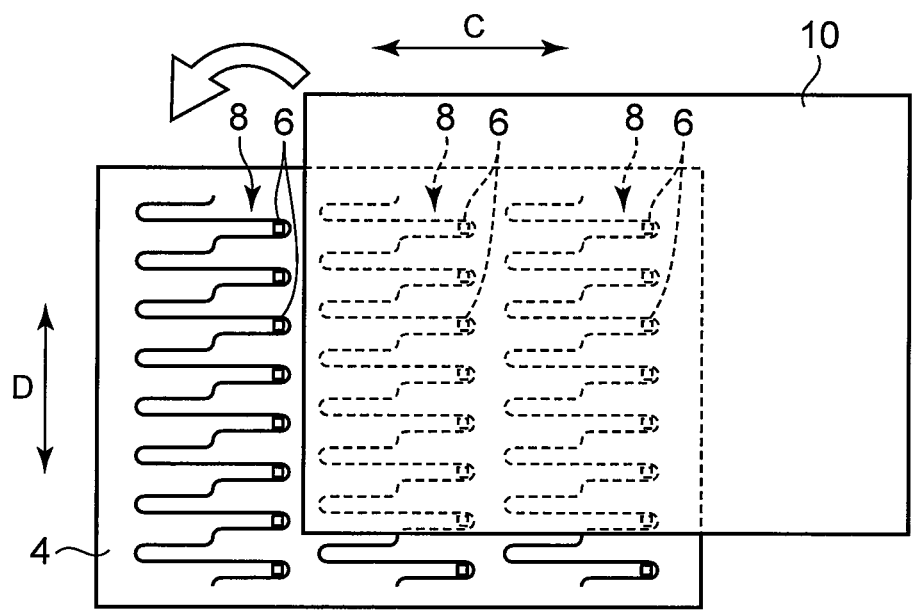
FIG. 7D is a schematic plan view illustrating a sequence of manufacturing an RFID tag along the flowchart of FIG. 6.

Next, the RFID module 6 and the booster antenna 8 are sealed (step S4). More specifically, as illustrated in FIG. 7D, the sealing member 10 (e.g., a transparent or colored resin sheet having a thermosetting adhesion layer such as epoxy resin) is disposed over the entire upper surface of the insulating base 4 on which the RFID module 6 and the booster antenna 8 are already disposed. Thus, the RFID module 6 and the booster antenna 8 are fixed in position and are protected from external impacts. Any method may be used as a method of sealing the RFID module 6 and the booster antenna 8. Embodiment 1 uses a sealing method of thermally pressing the sheet-like sealing member 10 against the insulating base 4.

Figure 7E:
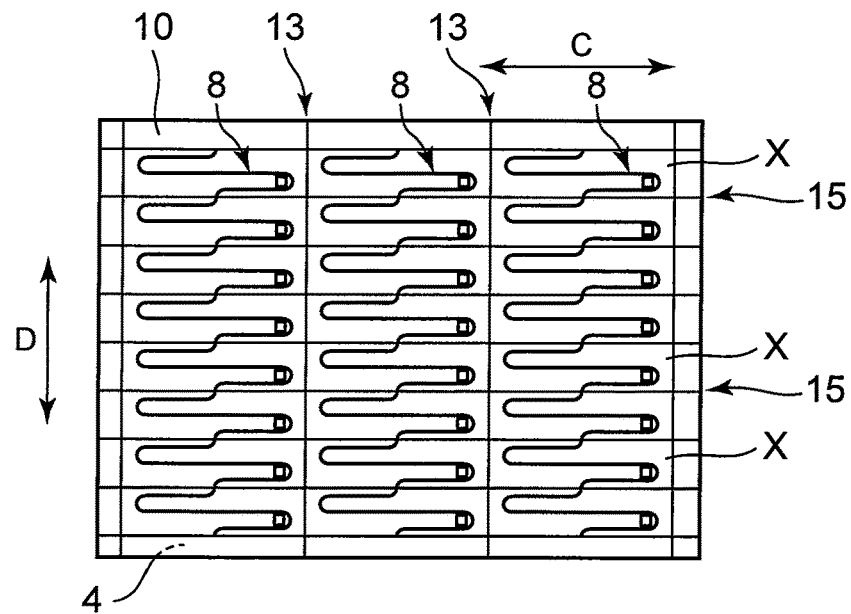
FIG. 7E is a schematic plan view illustrating a sequence of manufacturing an RFID tag along the flowchart of FIG. 6.

Next, cutting into individual RFID tags 2 is performed (step S5). More specifically, as illustrated in FIG. 7E, the insulating base 4 and the booster antenna 8 are cut along the plurality of cutting lines 13 and 15. More specifically, the insulating base 4 and the booster antenna 8 are cut along the plurality of longitudinal cutting lines 13 and the plurality of lateral cutting lines 15. Each of the longitudinal cutting lines 13 extends in direction D between two adjacent metal wires. Each of the lateral cutting lines 15 extends in direction C between the one end 8*a* and the other end 8*g* of each pattern of the booster antenna 8.

Any method may be used as a cutting method in step S5. Embodiment 1 uses a thermal cutting method. In the thermal cutting, the sealing member 10 may be melted by heat such that the one end 8*a* and the other end 8*g* of the booster antenna 8 are covered with the sealing member 10. When the sheet of the insulating base 4 is chemical fiber, e.g., polyester, it may also be melted by heat and then coupled itself.

Figure 7F:
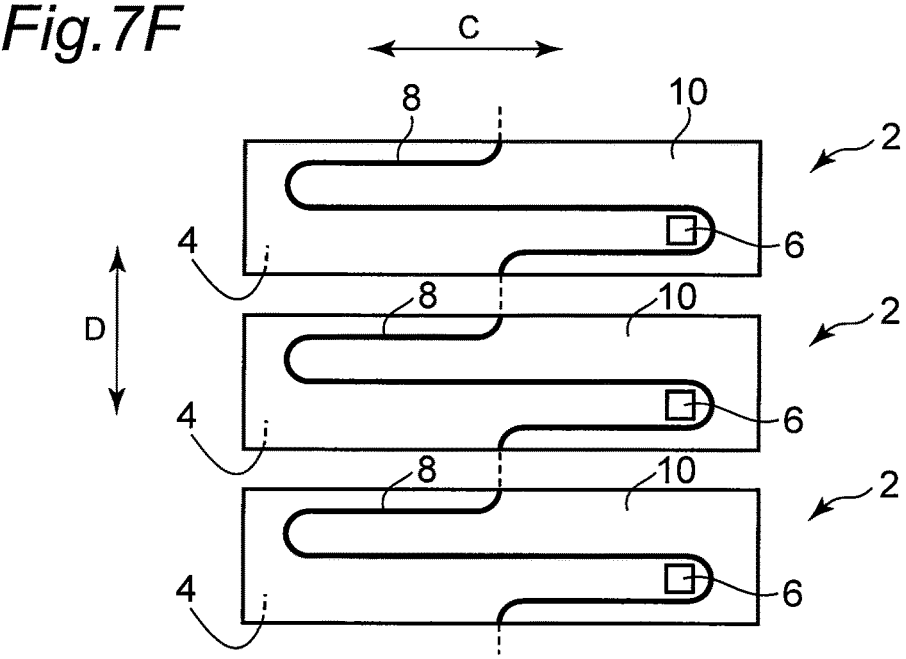
FIG. 7F is a schematic plan view illustrating a sequence of manufacturing an RFID tag along the flowchart of FIG. 6.

Step S5 cuts the insulating base 4 and the booster antenna 8 for each region X partitioned by the cutting lines 13 and the cutting lines 15 to divide the RFID tags 2. Thus, the plurality of RFID tags 2 is manufactured as illustrated in FIG. 7F, in which each RFID tag 2 includes the booster antenna 8 of the same pattern.

By the aforementioned manufacturing method, the booster antennas 8 of a plurality of repetitive patterns are formed from one metal wire and then cut into each individual pattern. Therefore, the plurality of RFID tags 2 each having the pattern of the booster antenna can be manufactured continuously. Thus, the RFID tags 2 can be manufactured more quickly at lower cost, increasing the productivity of the RFID tags 2.

As described above, the method for manufacturing the RFID tag 2 of exemplary embodiment 1 includes preparing the sheet-like insulating base 4 having a plurality of regions X which are arranged in direction D (that is, first direction), the plurality of regions X being delimited (or delineated) with each other at the plurality of cutting lines 15 along direction C (that is, second direction) crossing direction D.

The manufacturing method further includes a disposing one metal wire (that is, a single metal wire to form booster antenna 8) across the plurality of regions X on the upper surface of the insulating base 4. In this step, the single metal wire is disposed to form a pattern including the first curved portion 8b and the second curved portion 8c in each region. The manufacturing method further includes disposing the RFID module 6 in each region X. In this step, the RFID module 6 is disposed in a region surrounded by the second curved portion 8c. The manufacturing method further includes cutting the one metal wire and the insulating base 4 along the cutting lines 13 and 15 to obtain the plurality of RFID tags 2 corresponding to the divided regions X.

According to such a manufacturing method, a pattern is formed a plurality of times by the one metal wire on the insulating base 4 and the RFID module 6 is disposed, and then the insulating base 4 is cut to be divided into each pattern. Thus, the RFID tags 2 each having the pattern of the metal wire can be manufactured continuously. Therefore, productivity of the RFID tag 2 can be increased.

The individual RFID tag 2 manufactured by the aforementioned manufacturing method includes the booster antenna 8, the RFID module 6, and the insulating base 4. The booster antenna 8 is comprised by the one metal wire bended within the plane (that is, patterning). The RFID module 6 includes: the feeding loop 14 configured to couple to the booster antenna 8 via an electromagnetic field; and the RFIC element 12 connected to the feeding loop 14. The sheet-like insulating base 4 is configured to hold the booster antenna 8 and the RFID module 6 within the same plane and includes the first side 4a and the second side 4b, which are opposite to each other. The booster antenna 8 is comprised by the one metal wire to have the one end 8a on the first side 4a of the insulating base 4 and the other end 8g on the second side 4b of the insulating base 4. The booster antenna 8 further includes the first curved portion 8b configured to reverse the direction of the metal wire extending from the one end 8a and the second curved portion 8c configured to reverse the direction of the metal wire, which is reversed by the first curved portion 8b, to connect to the other end 8g. Furthermore, the RFID module 6 is disposed in a region surrounded by the second curved portion 8c.

According to the method for manufacturing the RFID tag 2 of embodiment 1, the insulating base 4 is cut such that the plurality of cutting lines 15 is cut parallel to each other along direction C. Furthermore, the metal wire is disposed on the insulating base 4 such that the first connecting portion 8d, the second connecting portion 8e, and the third connecting portion 8f, which are reversed by the first curved portion 8b and the second curved portion 8c, extend parallel to the cutting lines 15.

Such a manufacturing method can simplify the arrangement of the metal wire, and can dispose the metal wire easily. Thus, the productivity of the RFID tag 2 can be further increased.

According to the individual RFID tag 2 manufactured by the aforementioned manufacturing method, the first side 4a and the second side 4b of the insulating base 4 extend substantially parallel to each other. Furthermore, the first connecting portion 8d, the second connecting portion 8e, and the third connecting portion 8f, which are reversed by the first curved portion 8b and the second curved portion 8c of the booster antenna 8, extend parallel to the first side 4a and the second side 4b.

According to the method for manufacturing the RFID tag 2 of exemplary embodiment 1, the metal wire is disposed on the insulating base 4 such that the one end 8a and the other end 8g of the metal wire corresponding to the cutting lines 15 are disposed on the same line extending parallel to direction D in each of the regions. Also, the metal wire is disposed such that each pattern of the metal wire has the same shape.

Such a method can manufacture the RFID tags 2 each having the same pattern of the metal wire continuously. Therefore, the productivity of the RFID tags 2 can be increased while stabilizing properties of the RFID tags 2.

According to the individual RFID tag 2 manufactured by the aforementioned manufacturing method, the one end 8a and the other end 8g of the booster antenna 8 are disposed on the same line extending in direction D within the plane.

Also, according to the method for manufacturing the RFID tag 2 of embodiment 1, when forming each pattern of the booster antenna 8, the metal wire is disposed to form the first connecting portion 8d, the second connecting portion 8e, and the third connecting portion 8f so as not to overlap with each other. The first connecting portion 8d extends to connect the one end 8a of the booster antenna 8 to one end of the first curved portion 8b, the one end of the first curved portion 8b corresponding to an end which is closer to the one end 8a. The second connecting portion 8e extends to connect the other end of the first curved portion 8b to one end of the second curved portion 8c, the one end of the second curved portion 8c corresponding to an end which is far from the other end 8g of the booster antenna 8. The third connecting portion 8f extends to connect the other end of the second curved portion 8c to the other end 8g of the booster antenna 8.

According to the exemplary manufacturing method, the metal wires of the booster antennas 8 are disposed without overlapping with each other, so the booster antennas 8 do not contact with each other. Therefore, a desired property of the RFID tag 2 can be achieved even if a booster antenna 8 with no insulating coating is used. Thus, production costs can be reduced while maintaining performance of the RFID tag 2.

According to the individual RFID tag 2 manufactured by the aforementioned manufacturing method, the booster antenna 8 is disposed to include the first connecting portion 8d, the second connecting portion 8e, and the third connecting portion 8f, which do not overlap with each other. The first connecting portion 8d extends to connect the one end 8a of the booster antenna 8 to one end of the first curved portion 8b, the one end of the first curved portion 8b corresponding to an end closer to the one end 8a. The second connecting portion 8e extends to connect the other end of the first curved portion 8b to one end of the second curved portion 8c, the one end of the second curved portion 8c corresponding to an end which is far from the other end 8g of the booster antenna 8. The third connecting portion 8f extends to connect the other end of the second curved portion 8c to the other end 8g of the booster antenna 8.

While exemplary embodiment 1 has been described above, it is noted that the present invention is not limited to embodiment 1. For example, in the exemplary embodiment 1, the RFID module 6 is disposed in a region surrounded by the second curved portion 8c, but it is not limited thereto. In an alternative aspect, the RFID module 6 may be disposed in a region surrounded by the first curved portion 8b.

Figure 9:
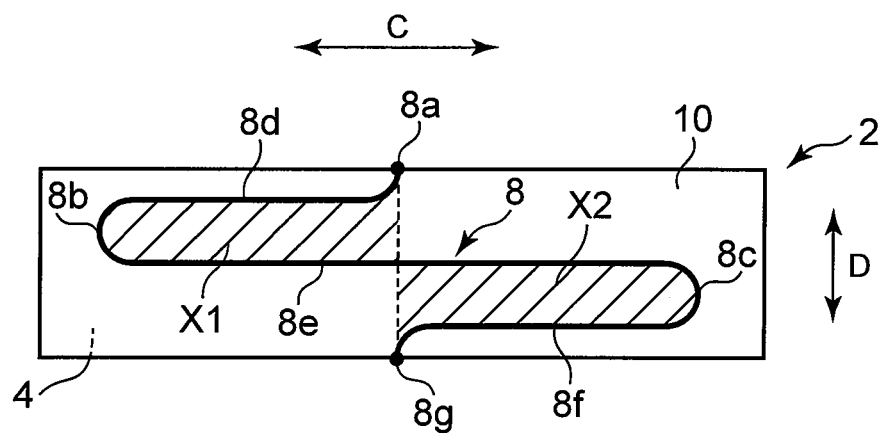
FIG. 9 is a schematic plan view of an RFID tag.

Alternatively, as illustrated in FIG. 9, the RFID module 6 may be disposed in regions X1 or X2 surrounded by metal wires including the first curved portion 8b and the second curved portion 8c. The regions X1 and X2 are both sandwiched by opposing metal wires. The region X1 includes a region (that is, left side region) surrounded by the first curved portion 8b and a region (that is, right side region)

made by the first connecting portion 8d and the second connecting portion 8e opposing with each other. Similarly, the region X2 includes a region (that is, right side region) surrounded by the second curved portion 8c and a region (that is, left side region) made by the second connecting portion 8e and the third connecting portion 8f opposing with each other. In such a case, communication between the RFID module 6 and the reader/writer can be achieved as well with using the booster antenna 8 as a booster.

It is noted that disposing the RFID module 6 in a region surrounded by the second curved portion 8c (or a first curved portion 8b) can lengthen an electromagnetic wave emitter part.

Furthermore, in exemplary embodiment 1, the sealing member 10 is melted to cover the one end 8a and the other end 8g of the booster antenna 8, but it is not limited thereto. For example, a method other than thermal cutting may be used, which exposes the one end 8a and the other end 8g to the outside at the first side 4a and the second side 4b of the insulating base 4 and the one end 8a and the other end 8g may be covered later by an insulating material or the like. In such a case, the one end 8a and the other end 8g of the booster antenna 8 are positioned at the first side 4a and the second side 4b of the insulating base 4, respectively, as well.

Furthermore, in exemplary embodiment 1, both the first curved portion 8b and the second curved portion 8c have a semicircular shape to reverse the direction of the metal wire by 180 degrees, but it should be appreciated that it not limited thereto, as they can reverse the direction of the metal wire by an angle different from 180 degrees. Also, when reversing the direction of the metal wire by the curved portions, the direction of the metal wire may be changed generally from direction C1 to direction C2 or generally from direction C2 to direction C1. For example, an arc angle of the second curved portion 8c, within which the RFID module 6 is disposed, may be set to an angle greater than 180 degrees to facilitate magnetic coupling to the RFID module 6.

Furthermore, in exemplary embodiment 1, the metal wire of the booster antenna 8 faces in direction D at the one end 8a and the other end 8g, but not limited thereto, the metal wire of the booster antenna 8 may face in a direction crossing direction D at these ends.

Furthermore, in exemplary embodiment 1, the insulating base 4 is cut into a rectangular shape, but it is not limited thereto. The insulating base 4 may be cut in any crossing directions.

Furthermore, in exemplary embodiment 1, the RFID module 6 and the booster antenna 8 are sealed by the sealing member 10, but it is not limited thereto. For example, if the metal wire of the booster antenna 8 has an insulating coating, the booster antenna 8 may be exposed on the insulating base 4 without being covered by the sealing member 10.

Furthermore, in exemplary embodiment 1, when the metal wire is disposed on the insulating base 4, three metal wires are disposed simultaneously, but not limited thereto, as one or a different number of metal wires may be disposed. If only one metal wire is disposed, the regions X for forming each pattern of the metal wire may be arranged only along direction D.

<Variation 1>

Next, explanation of variation 1 of embodiment 1 is made below with reference to FIG. 10.

Figure 10:
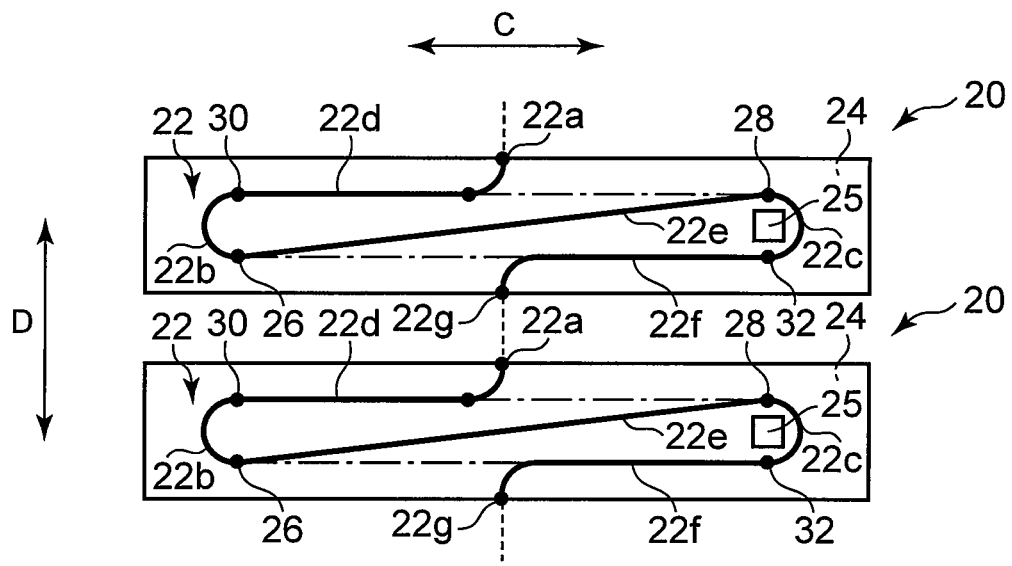
FIG. 10 is a schematic plan view of an RFID tag according to variation 1 of embodiment 1.

FIG. 10 is a plan view of an RFID tag 20 according to variation 1. FIG. 10 illustrates two adjacent RFID tags 20 that have been made by cutting and dividing. Linkage before cutting is indicated by the dotted lines. For descriptive purposes, the sealing member is not shown in FIG. 11 and also subsequent drawings.

As illustrated in FIG. 10, the RFID tag 20 of variation 1 differs from the RFID tag 2 of embodiment 1 in that a second connecting portion 22e of a booster antenna 22 extends with being inclined obliquely, not parallel to direction C which is the longitudinal direction of an insulating base 24.

As illustrated in FIG. 10, the booster antenna 22 includes a first connecting portion 22d extending from one end 22a, a first curved portion 22b, the second connecting portion 22e, a second curved portion 22c, and a third connecting portion 22f. Shapes of the portions excluding the second connecting portion 22e are the same as those of the booster antenna 8 of embodiment 1.

The RFID module 25 is disposed on an inner side of the second curved portion 22c.

The second connecting portion 22e extends straightly to connect the first curved portion 22b to the second curved portion 22c. The second connecting portion 22e connects a connection point 26, which is the other end of the first curved portion 22b, to a connection point 28, which is one end of the second curved portion 22c.

In variation 1, the connection point 26, which is the other end of the first curved portion 22b, and a connection point 32, which is the other end of the second curved portion 22c, are positioned at the same position in direction D, which is the lateral direction of the insulating base 24. Similarly, the connection point 28, which is one end of the second curved portion 22c, and a connection point 30, which is one end of the first curved portion 22b, are positioned at the same position in direction D. As such, the first curved portion 22b and the second curved portion 22c are disposed at the same position in direction D.

The aforementioned second connecting portion 22e extends from the other end (that is, connection point 26) of the first curved portion 22b to the one end (that is, connection point 28) of the second curved portion 22c with being inclined toward the one end 22a.

Disposing the second connecting portion 22e to be inclined in direction D as described above can shorten a length of the booster antenna 22 in direction D while ensuring a total length of the metal wire of the entire booster antenna 22. Thus, the length of the RFID tag 20 in direction D can be shortened, and the RFID tag 20 can be reduced in size.

For manufacturing the RFID tag 20 of variation 1, the metal wire has been disposed on the insulating base 24 (step S2) such that the positions of the first curved portion 22b and the second curved portion 22c in each region X surrounded by the cutting lines 13 and 15 are the same position in direction D.

<Variation 2>

Next, explanation of variation 2 of embodiment 1 is made below with reference to FIG. 11.

Figure 11:
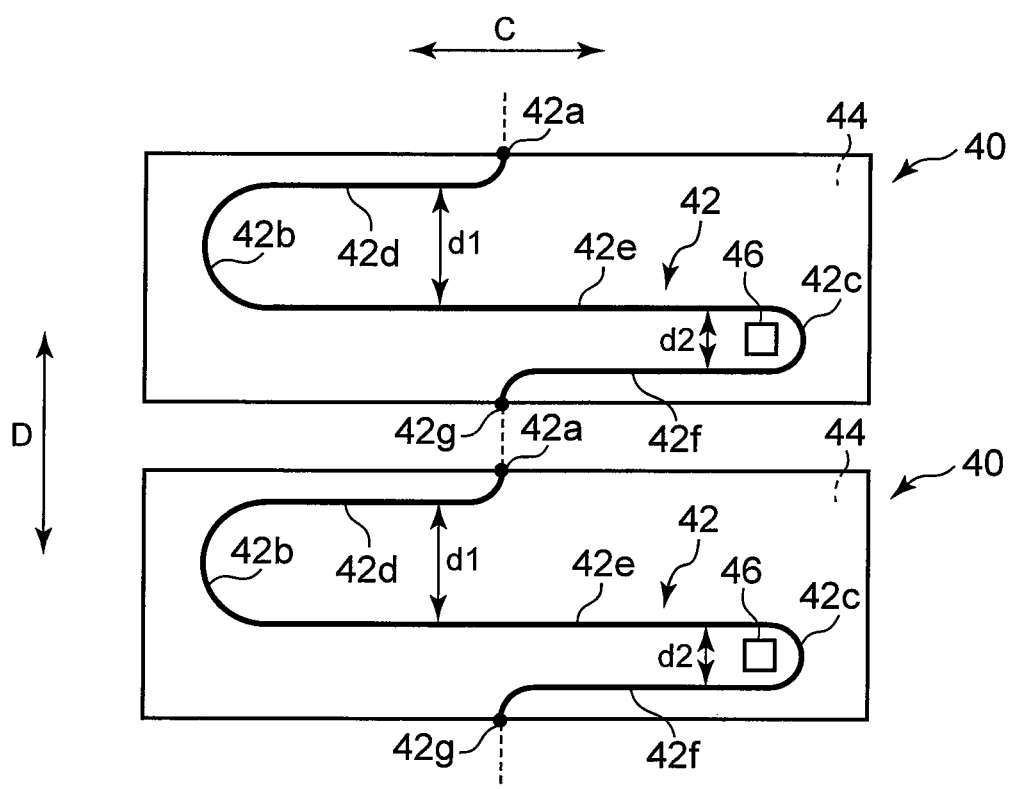
FIG. 11 is a schematic plan view of an RFID tag according to variation 2 of embodiment 1.

FIG. 11 is a plan view of an RFID tag 40 according to variation 2. As illustrated in FIG. 11, the RFID tag 40 of variation 2 differs from the RFID tag 2 of embodiment 1 in that a first curved portion 42b of a booster antenna 42 is larger than a second curved portion 42c.

As illustrated in FIG. 11, the booster antenna 42 includes a first connecting portion 42d extending from one end 42a, the first curved portion 42b, a second connecting portion 42e, the second curved portion 42c, and a third connecting portion 42f connected to the other end 42g. Shapes of the portions excluding the first curved portion 42b are the same as the shapes of the booster antenna 8 of embodiment 1.

An RFID module 46 is disposed on an inner side of the second curved portion 42c.

As illustrated in FIG. 11, the first curved portion 42b is formed as a 180-degree arc, which is greater than the second curved portion 42c. With such a shape, a distance d1 between the first connecting portion 42d and the second connecting portion 42e is greater than a distance d2 between the second connecting portion 42e and the third connecting portion 42f.

With the RFID tag 40 of variation 2, the first curved portion 42b and a neighbor metal wire thereof for functioning as an emitter during communication with a reader/writer makes a large gap, thereby enhancing a booster function of the booster antenna 42.

For manufacturing the RFID tag 40 of variation 2, the metal wire is disposed on an insulating base 44 (step S2) such that the first curved portion 42b has a larger diameter of arc than that of the second curved portion 42c in each region X surrounded by the cutting lines 13 and 15.

Embodiment 2

Explanation is made below regarding RFID tags 50 and 60 of exemplary embodiment 2 of the present invention. Explanation of exemplary embodiment 2 is made mainly for a difference point from embodiment 1, and overlapping explanation is omitted with respect to embodiment 1.

Figure 12:
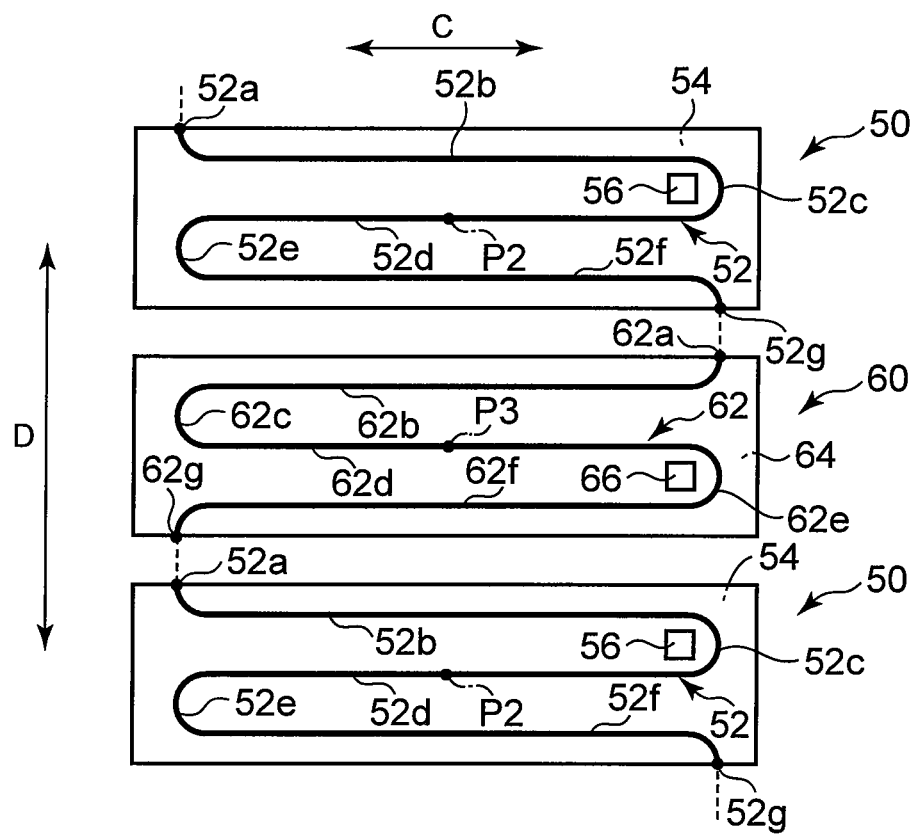
FIG. 12 is a schematic plan view of an RFID tag according to embodiment 2.

As illustrated in FIG. 12, in embodiment 2, the RFID tag 50 and the RFID tag 60 are manufactured, which have booster antennas of different shapes. For obtaining the individual RFID tags 50 and 60, the RFID tags 50 and 60 which were alternately and continuously formed has been cut.

Next, explanation will be made below regarding the RFID tag 50 and the RFID tag 60.

The RFID tag 50 includes a booster antenna 52, an insulating base 54, and an RFID module 56.

As shown, the booster antenna 52 includes a first connecting portion 52b extending from one end 52a, a first curved portion 52c, a second connecting portion 52d, a second curved portion 52e, and a third connecting portion 52f extending to the other end 52g.

The booster antenna 52 has a point-symmetric shape within a plane on the insulating base 54. More specifically, the one end 52a and the other end 52g of the booster antenna 52 are positioned at different positions in direction C of the insulating base 54, and also at point-symmetric positions with respect to a center P2 of the insulating base 54, the center P2 being a midpoint of the length of the booster antenna 52. As well, the first connecting portion 52b and the third connecting portion 52f are also formed in a point-symmetric shape, and the first curved portion 52c and the second curved portion 52e are also formed in a point-symmetric shape. The second connecting portion 52d extends straightly along direction C to pass the center P2 of the insulating base 54.

The RFID module 56 is disposed on an inner side of the first curved portion 52c.

As illustrated in FIG. 12, the RFID tag 60 next to the aforementioned RFID tag 50 includes a booster antenna 62, an insulating base 64, and an RFID module 66.

The booster antenna 62 includes a first connecting portion 62b extending from one end 62a, a first curved portion 62c, a second connecting portion 62d, a second curved portion 62e, and a third connecting portion 62f connecting to the other end 62g.

Similar to the booster antenna 52, the booster antenna 62 has a point-symmetric shape within a plane on the insulating base 64 with respect to a center P3 of an insulating base 64, which is a midpoint of a length of the booster antenna 62.

The RFID module 66 is disposed on an inner side of the second curved portion 62e.

The one end 62a of the booster antenna 62 is set in a position corresponding to the other end 52g of the adjacent booster antenna 52. Similarly, the other end 62g of the booster antenna 62 is set in a position corresponding to the one end 52a of the booster antenna 52.

Furthermore, the one end 52a and the other end 52g of the booster antenna 52 are set in symmetric positions related to the center P2. Similarly, the one end 62a and the other end 62g of the booster antenna 62 are set in symmetric positions with respect to the center P3.

With such a positioning, the booster antenna 52 and the booster antenna 62 have symmetric shapes with each other in plan view. In other words, rotating the booster antenna 52 or the booster antenna 62 by 180 degrees about a central axis extending direction D will make the same pattern as that of the booster antenna 62 or the booster antenna 52. Thus, the booster antenna 52 and the booster antenna 62 that have similar patterns not the same pattern can be used. Thus, property of the RFID tags 50 and 60 can be stabilized.

For manufacturing the RFID tags 50 and 60, booster antennas 52 and 62 are formed from one metal wire on an original insulating base prior to cutting into the insulating bases 54 and 64 and then the original insulating base and the booster antennas are cut into each region. Thus, the RFID tags 50 and 60 having the booster antennas 52 and 62 of symmetric patterns as illustrated in FIG. 12 can be manufactured continuously, and productivity of the RFID tags 50 and 60 can be enhanced.

It is noted that the method for manufacturing the RFID tags 50 and 60 of exemplary embodiment 2 is similar to the method for manufacturing the RFID tag 2 of embodiment 1, and therefore explanation of the manufacturing method of embodiment 2 is omitted.

According to the method for manufacturing the RFID tag 50 of exemplary embodiment 2 described above, the metal wire is disposed such that the one end 52a and the other end 52g of the booster antenna 52 are disposed at different positions in direction C within the plane, for making each pattern of the booster antenna 52. At this time, the metal wire is disposed such that each pattern of the booster antenna 52 has a point-symmetric shape within the plane. For making each pattern of the booster antenna 62, a metal wire is disposed in a similar way.

According to the exemplary manufacturing method, the booster antennas 52 and 62 of symmetric patterns can be formed in the neighboring RFID tags 50 and 60, respectively. Thus, the RFID tags 50 and 60 having similar property to embodiment 1 and variations 1 and 2 can continuously be manufactured by a method different from that of embodiment 1 and variations 1 and 2.

According to the RFID tag 50 manufactured by the aforementioned manufacturing method, the one end 52a and the other end 52g of the booster antenna 52 are positioned at different positions along direction C within the plane, and the booster antenna 52 has a point-symmetric shape within the plane. The same applies to the RFID tag 60.

With such a configuration, the booster antennas 52 and 62 of symmetric patterns can be formed in the neighboring RFID tags 50 and 60, respectively. Thus, the RFID tags 50 and 60 having similar property to embodiment 1 and variations 1 and 2 can continuously be manufactured by a method different from that of embodiment 1 and variations 1 and 2.

It is noted that in exemplary embodiment 2, the RFID module 56 is disposed on an inner side of the first curved portion 52c and the RFID module 66 is disposed on an inner side of the second curved portion 62e, but it is not limited thereto. The RFID module 56 may be disposed on an inner side of the second curved portion 52e, and the RFID module 66 may be disposed on an inner side of the first curved portion 62c.

<Variation>

Next, explanation regarding a variation of embodiment 2 will be made below with reference to FIG. 13.

Figure 13:
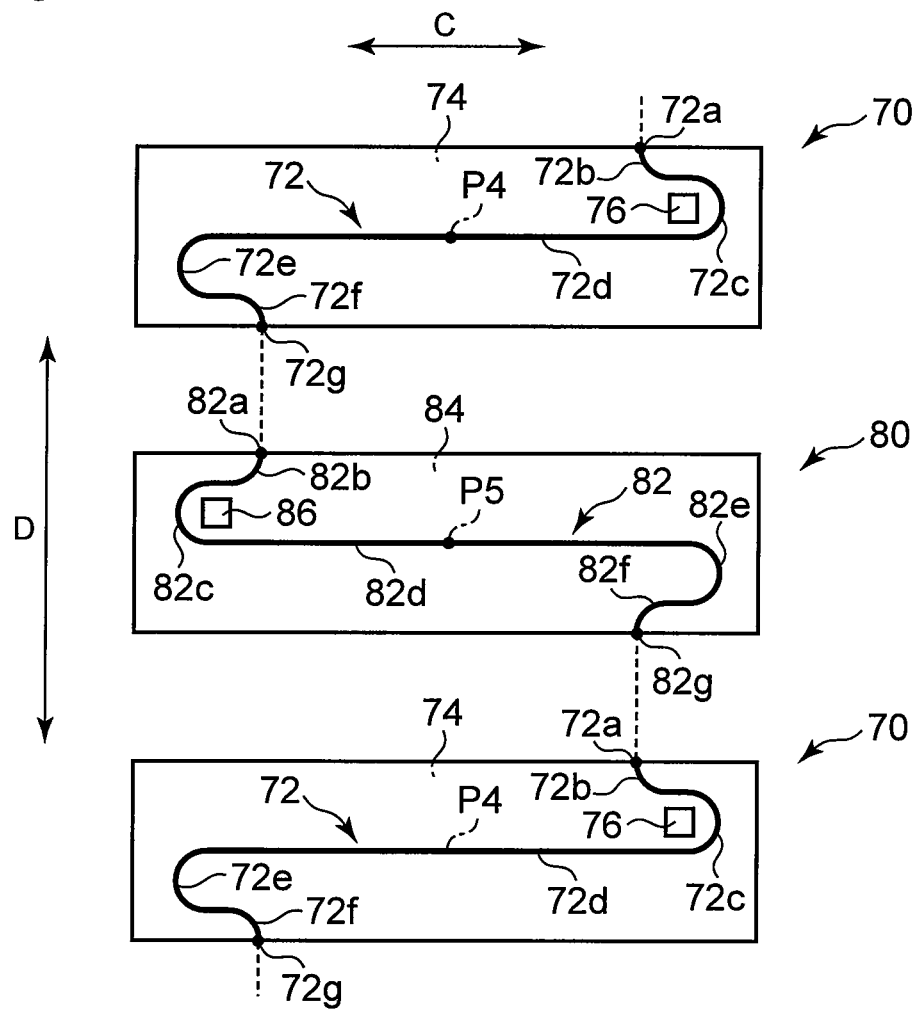
FIG. 13 is a schematic plan view of an RFID tag according to a variation of embodiment 2.

FIG. 13 is a plan view of RFID tags 70 and 80 according to the variation. As illustrated in FIG. 13, the RFID tags 70 and 80 of the variation are different from the RFID tags 50 and 60 of embodiment 2 with respect to positions of one ends 72a and 82a and the other ends 72g and 82g of the booster antennas 72 and 82.

As illustrated in FIG. 13, the RFID tags 70 and 80 of the variation have been manufactured by cutting of the RFID tags 70 and 80 that were alternately and continuously formed, similar to the RFID tags 50 and 60 of embodiment 2.

The booster antenna 72 of the RFID tag 70 includes a first connecting portion 72b extending from one end 72a, a first curved portion 72c, a second connecting portion 72d, a second curved portion 72e, and a third connecting portion 72f extending to the other end 72g. With such a configuration, the booster antenna 72 of the RFID tag 70 has a point-symmetric shape within the plane on an insulating base 74. The RFID module 76 is disposed on an inner side of the first curved portion 72c.

Meanwhile, the booster antenna 82 of the RFID tag 80 includes a first connecting portion 82b extending from one end 82a, a first curved portion 82c, a second connecting portion 82d, a second curved portion 82e, and a third connecting portion 82f extending to the other end 82g. With such a configuration, the booster antenna 82 of the RFID tag 80 has a point-symmetric shape within the plane on an insulating base 84. The RFID module 86 is disposed on an inner side of the first curved portion 82c.

The one end 72a and the other end 72g of the booster antenna 72 are set in symmetric positions with respect to a center P4, and the one end 82a and the other end 82g of the booster antenna 82 are set in symmetric positions with respect to a center P5.

With such a positioning, the booster antenna 72 and the booster antenna 82 have bilaterally-symmetric shapes in plan view, providing similar effects to embodiment 2.

In this variation, the RFID module 76 is disposed on an inner side of the first curved portion 72c and the RFID module 86 is disposed on an inner side of the first curved portion 82c, but it is not limited thereto. The RFID module 76 may be disposed on an inner side of the second curved portion 72e, and the RFID module 86 may be disposed on an inner side of the second curved portion 82e.

In general, it is noted that the present invention has been described above with reference to the exemplary embodiments and the variations, but the present invention is not limited thereto.

Moreover, the present disclosure is sufficiently described with reference to the accompanying drawings in relation to preferred embodiments, but various variations or modifications may be apparent to those skilled in the art. Such variations or modifications should be understood to be included within the scope of the present disclosure by the accompanying claims without departing therefrom. Furthermore, combinations of elements or changes of orders in the embodiments can be achieved without departing from the scope and idea of the present disclosure.

By properly combining any of the various embodiment or their variations described above, the effects possessed can be produced.

EXPLANATIONS OF REFERENCE NUMBERS 2, 20, 40, 50, 60, 80 RFID tag
3 outfit (goods)
4, 24, 44, 54, 64, 74, 84 insulating base
4a first side
4b second side
4c third side
4d fourth side
6, 25, 46, 56, 66, 76, 86 RFID module
8, 22, 42, 52, 62, 72, 82 booster antenna (metal wire)
8a, 22a, 42a, 52a, 62a, 72a, 82a one end
8b, 22b, 42b, 52b, 62b, 72b, 82b first curved portion
8c, 22c, 42c, 52c, 62c, 72c, 82c second curved portion
8d, 22d, 42d, 52d, 62d, 72d, 82d first connecting portion
8e, 22e, 42e, 52e, 62e, 72e, 82e second connecting portion
8f, 22f, 42f, 52f, 62f, 72f, 82f third connecting portion
8g, 22g, 42g, 52g, 62g, 72g, 82g the other end
10 sealing member
12 RFID element
14 feeding loop
16 substrate
17 interconnection
18 sealing resin
P1, P2, P3, P4 central portion
X region

The invention claimed is:

1. A method for manufacturing an RFID tag, comprising:
preparing a sheet-like insulating base having a plurality of regions arranged in a first direction and delineated with each other at a plurality of cutting lines along a second direction that intersects the first direction;
disposing a single continuous metal wire across the plurality of regions on an upper surface of the insulating base, such that the disposed single continuous metal wire forms a pattern in each of the plurality of regions that includes a first curved portion that reverses a direction of the single continuous metal wire and a second curved portion that reverse a direction of the single metal wire reversed by the first curved portion;
disposing in each of the plurality of regions a respective RFID module that includes a feeding loop configured to couple to the metal wire via an electromagnetic field, and an RFIC element connected to the feeding loop, wherein each RFID module is disposed in a respective region surrounded by the single continuous metal wire including at least one of the first and second curved portions, such that the single continuous metal wire surrounds at least opposing sides of each RFID module with the RFID module being disposed therebetween and the RFID module not directly connected to the single continuous metal wire; and
cutting the single continuous metal wire and the sheet-like insulating base along the plurality of cutting lines to prepare a plurality of RFID tags corresponding to the plurality of regions divided by the cutting.

2. The method for manufacturing an RFID tag according to claim 1, wherein the cutting of the single continuous metal wire and the sheet-like insulating base includes cutting the metal wire and the sheet-like insulating base along the plurality of cutting lines that are provided parallel to each other along the second direction, which is perpendicular to the first direction.

3. The method for manufacturing an RFID tag according to claim 2, wherein the disposing of the single continuous metal wire includes disposing the single continuous metal wire parallel to the plurality of cutting lines extending in the second direction, with the single metal wire reversed by the first and second curved portions.

4. The method for manufacturing an RFID tag according to claim 3, wherein the disposing of the single continuous metal wire includes disposing the single continuous metal wire such that, in each of the plurality of regions, first and second ends of the single continuous metal wire are disposed on a same line extending parallel to the first direction.

5. The method for manufacturing an RFID tag according to claim 1, wherein the disposing of the single continuous metal wire across the plurality of regions on the upper surface of the insulating base comprises disposing the single continuous metal wire to form the pattern in each of the plurality of regions to have a same shape in each region.

6. The method for manufacturing an RFID tag according to claim 3, wherein the disposing of the single continuous metal wire comprises disposing the single continuous metal wire such that each pattern of the single continuous metal wire on each of the plurality of regions has a point-symmetric shape.

7. The method for manufacturing an RFID tag according to claim 1, wherein the disposing of the single continuous metal wire comprises disposing the single continuous metal wire continuously without returning in the first direction.

8. The method for manufacturing an RFID tag according to claim 1, wherein the disposed single continuous metal wire forms the pattern in each of the plurality of regions that includes the first and second curved portions that are each formed in an arc shape having a central angle of 180 degrees.

9. The method for manufacturing an RFID tag according to claim 8, further comprising disposing the single continuous metal wire across the plurality of regions to form the first curved portion, which is formed by a first connecting portion and a second connecting portion extending parallel to each other in the second direction, and the second curved portion, which is formed by the second connecting portion and a third connecting portion extending parallel to each other in the second direction.

10. The method for manufacturing an RFID tag according to claim 9, wherein a first distance extending in the first direction and between the first and second connecting portions is greater than a second distance extending in the first direction and between the second and third connecting portions.

11. The method for manufacturing an RFID tag according to claim 1, further comprising disposing the respective RFID module in each of the plurality of regions at a position offset from a center of the respective region, such that the respective RFID module is configured to provide a stable coupling with a booster antenna formed by the single continuous metal wire.

12. An RFID tag comprising:
a sheet-like insulating base including first and second sides opposite to each other;
a booster antenna disposed on the insulating base and including a single continuous metal wire bended within a plane, with the single continuous metal wire having a first end on the first side of the insulating base and a second end on the second side of the insulating base, and the single continuous metal wire including a first curved portion that reverses a direction of the single continuous metal wire and a second curved portion that reverse a direction of the single continuous metal wire reversed by the first curved portion; and
an RFID module disposed on the insulating base in a same plane as the booster antenna and in a region surrounded by at least one of the first and second curved portions of the single continuous metal wire, the RFID module including a feeding loop configured to couple to the booster antenna via an electromagnetic field, and an RFIC element connected to the feeding loop
wherein the single continuous metal wire surrounds at least opposing sides of the RFID module, such that the RFID module is disposed therebetween and does not directly connect to the single continuous metal wire.

13. The RFID tag according to claim 12, wherein the first side and the second side of the sheet-like insulating base extend substantially parallel to each other.

14. The RFID tag according to claim 13, wherein the single continuous metal wire reversed by the first and second curved portions of the booster antenna extends parallel to the first side and the second side of the sheet-like insulating base.

15. The RFID tag according to claim 14, wherein the first and second ends of the booster antenna are disposed on a same line perpendicular to directions in which the first side and the second side extend within the plane.

16. The RFID tag according to claim 14, wherein the booster antenna has a point-symmetric shape within the plane.

17. The RFID tag according to claim 12, wherein the booster antenna extends from the first end to the second end without returning in a direction perpendicular to a direction in which the first and second sides extend.

18. The RFID tag according to claim 12, wherein the first and second curved portions are each formed in an arc shape having a central angle of 180 degrees.

19. The RFID tag according to claim 18,
wherein the first curved portion is formed by a first connecting portion and a second connecting portion extending parallel to each other, and the second curved portion is formed by the second connecting portion and a third connecting portion extending parallel to each other, and
wherein a first distance extending between the first and second connecting portions is greater than a second distance extending between the second and third connecting portions.

20. The RFID tag according to claim 12, wherein the RFID module is disposed at a position offset from a center of the sheet-like insulating base, such that the RFID module is configured to provide a stable coupling with a booster antenna.

* * * * *